US011035791B2

(12) United States Patent
Tong et al.

(10) Patent No.: US 11,035,791 B2
(45) Date of Patent: Jun. 15, 2021

(54) DUAL IN SITU INFRARED SPECTROSCOPY FOR FUEL CELLS

(71) Applicant: Georgetown University, Washington, DC (US)

(72) Inventors: YuYe J. Tong, Gaithersburg, MD (US); Eric G. Sorte, Washington, DC (US); De-Jun Chen, Washington, DC (US)

(73) Assignee: Georgetown University, Washington, DC (US)

( * ) Notice: Subject to any disclaimer, the term of this patent is extended or adjusted under 35 U.S.C. 154(b) by 427 days.

(21) Appl. No.: 15/779,465

(22) PCT Filed: Nov. 30, 2016

(86) PCT No.: PCT/US2016/064131
§ 371 (c)(1),
(2) Date: May 25, 2018

(87) PCT Pub. No.: WO2017/095872
PCT Pub. Date: Jun. 8, 2017

(65) Prior Publication Data
US 2018/0259450 A1    Sep. 13, 2018

Related U.S. Application Data

(60) Provisional application No. 62/261,218, filed on Nov. 30, 2015.

(51) Int. Cl.
*G01N 21/552*    (2014.01)
*G01N 21/75*    (2006.01)
(Continued)

(52) U.S. Cl.
CPC ....... *G01N 21/552* (2013.01); *G01N 21/3563* (2013.01); *G01N 21/75* (2013.01);
(Continued)

(58) Field of Classification Search
CPC ....... G01N 2201/0638; G01N 21/3563; G01N 21/75; G01N 21/552; H01M 8/04313; H01M 8/1011; Y02E 60/523
See application file for complete search history.

(56) References Cited

U.S. PATENT DOCUMENTS

| 8,416,417 B2* | 4/2013 | Foley | G01N 21/553 |
| | | | 356/445 |
| 2005/0053974 A1* | 3/2005 | Lakowicz | G01N 21/6452 |
| | | | 435/6.12 |

(Continued)

FOREIGN PATENT DOCUMENTS

JP    2007250407 A    9/2007

OTHER PUBLICATIONS

Bo et al., "In Situ Stark Effects with Inverted Bipolar Peaks for Adsorbed CO on Pt Electrodes in 50° C Direct Methanol Fuel Cells," *J. Phys. Chem. B*, 104(31): 7377-7381, Jul. 11, 2000.
(Continued)

*Primary Examiner* — Shogo Sasaki
(74) *Attorney, Agent, or Firm* — Klarquist Sparkman, LLP

(57) ABSTRACT

A rotating dual-electrode infrared cell for in situ electrochemical attenuated-total-reflection infrared spectroscopy (ATR-IRS) comprising:
a first and second prism;
a first and second thin metal film,
wherein the first thin metal film is coated on a surface of the first prism and the second thin metal film is coated on a surface of the second prism;
an ion exchange membrane; and
a first and second cell body,
wherein each cell body comprises an inlet and outlet.

21 Claims, 7 Drawing Sheets

(51) Int. Cl.
*H01M 8/1011* (2016.01)
*H01M 8/04313* (2016.01)
*G01N 21/3563* (2014.01)

(52) U.S. Cl.
CPC ..... *H01M 8/04313* (2013.01); *H01M 8/1011* (2013.01); *G01N 2201/0638* (2013.01); *Y02E 60/50* (2013.01)

(56) References Cited

U.S. PATENT DOCUMENTS

| | | | |
|---|---|---|---|
| 2015/0051064 A1 | 2/2015 | Tong | |
| 2015/0109606 A1* | 4/2015 | Peale | G01J 1/42 356/30 |
| 2015/0323383 A1* | 11/2015 | Pastore | G01J 3/28 356/326 |
| 2016/0195473 A1* | 7/2016 | Fujiwara | A61B 5/0261 250/553 |
| 2018/0117851 A1* | 5/2018 | Reese | B29C 64/106 |
| 2018/0313754 A1* | 11/2018 | Cappo | G01N 21/553 |

OTHER PUBLICATIONS

Fan et al., "In Situ Fourier Transform Infrared-Diffuse Reflection Spectroscopy of Direct Methanol Fuel Cell Anodes and Cathodes," *J. Electrochem. Soc.*, 143(10): 3053-3057, 1996.

Fan et al., "In Situ FTIR-Diffuse Reflection Spectroscopy of the Anode Surface in a Direct Methanol/Oxygen Fuel Cell," *J. Electrochem. Soc.*, 143(2): L21-L23, 1996.

International Search Report and Written Opinion issued for International Application No. PCT/US2016/064131 dated Mar. 14, 2017.

Kendrick et al., "Elucidating the Ionomer-Electrified Metal Interface," *J. Am. Chem. Soc.*, vol. 132, pp. 17611-17616, Nov. 18, 2010.

Kendrick et al., "Operando infrared spectroscopy of the fuel cell membrane electrode assembly Nafion-platinum interface," *International Journal of Hydrogen Energy*, vol. 39, pp. 2751-2755, Aug. 28, 2013.

Lewis et al., "Operando x-ray absorption and infrared fuel cell spectroscopy," *Electrochimica Acta*, vol. 56, pp. 8827-8832, Jul. 29, 2011.

Liu et al., "A review of anode catalysis in the direct methanol fuel cell," *Journal of Power Sources*, 155(2): 95-110, Apr. 21, 2006.

Lu et al., "In Situ FTIR Spectroscopic Studies of Adsorption of CO, SCN⁻, and Poly(*o*-phenylenediamine) on Electrodes of Nanometer Thin Films of Pt, Pd and Rh: Abnormal Infrared Effects (AIREs)," *Langmiur*, 16(2): 778-786, Nov. 24, 1999.

Sorte et al., "Dual-Electrode In Situ Infrared Spectroscopy for Fuel Cells," *Journal of the Electrochemical Society*, 163(4): H3038-H3042, Dec. 3, 2015.

Wasmusa et al., "Methanol oxidation and direct methanol fuel cells: a selective review," *Journal of Electroanalytical Chemistry*, 461(1-2): 14-31, Jan. 29, 1999.

* cited by examiner

DUAL IN SITU INFRARED SPECTROSCOPY FOR FUEL CELLS

CROSS REFERENCE TO RELATED APPLICATIONS

This application is the U.S. National Stage of International Application No. PCT/US2016/064131, filed Nov. 30, 2016, which was published in English under PCT Article 21(2), which in turn claims the benefit of U.S. Provisional Application No. 62/261,218, filed Nov. 30, 2015, which is incorporated herein by reference.

BACKGROUND

Fuel cells and rechargeable batteries are attractive energy technologies due to their zero (or very low) polluting emissions. Despite being one of the oldest electrical conversion technologies known, interest in fuel cells has increased dramatically over the past several decades. At the same time, rechargeable batteries are becoming a major modern form of energy storage due to their adaptability, flexibility, and mobility. Research efforts in fuel cell and battery fundamentals and design have been broad and cross-disciplined, focusing on understanding anodic and cathodic electrochemistry, materials optimization, and practical implementation and safety.

The recent heightened interest in fuel cell and battery technologies has driven a demand for new research tools to study their operational chemistry. Demand is particularly strong for research techniques that can help unravel the fundamental electrochemistry in the working fuel cell and battery while in operation. These so-called in situ techniques permit researchers to gain important fundamental information about the performance of a studied component under actual operation conditions and to understand it in the context of the entire system.

In a series of papers from 1996, Smotkin et al. introduced in situ Fourier transform infrared spectroscopy (FTIR) of catalytic surfaces of membrane electrode assemblies in working fuel cells. Further work followed, which developed the in situ FTIR methods on anode catalysts under operating conditions. These in situ fuel cell investigations focused on a variety of fuel cell characteristics, including CO formation, Stark tuning curves, and oxygen reduction at the fuel cell. Several excellent reviews of direct methanol (MeOH) fuel cells (DMFCs) have been published that provide an extensive overview of progress made with in situ methods in these systems. Despite the extensive amount of work directed to understanding DMFCs, the majority of studies have focused only on the anode of membrane assembly electrodes. In this work, we have developed a novel dual-electrode in situ IR setup that for the first time enables IR spectroscopic access to both the anodic and the cathodic reactions of a fuel cell during mimicked cell operation. The same type of measurements can be extended to study batteries in a straightforward fashion.

SUMMARY

Disclosed herein in one embodiment is a rotating dual-electrode infrared cell for in situ electrochemical attenuated-total-reflection infrared spectroscopy (ATR-IRS) comprising:
  a first and second prism;
  a first and second thin metal film,
  wherein the first thin metal film is coated on a surface of the first prism and the second thin metal film is coated on a surface of the second prism;
  an ion exchange membrane; and
  a first and second cell body,
  wherein each cell body comprises an inlet and outlet.

Also disclosed herein is a device comprising:
  (a) a module comprising:
    (i) a first prism having a first metal film disposed on an inner surface of the first prism and a second prism having a second metal film disposed on an inner surface of the second prism;
    (ii) a fuel cell body located between the inner surface of the first prism and the inner surface of the second prism;
  (b) a light source configured to direct a light beam to the first prism or to the second prism; and
  (c) a detector configured to receive a light beam reflected from the first prism or from the second prism.

Further disclosed herein is a method comprising performing in situ electrochemical attenuated-total-reflection infrared spectroscopy (ATR-IRS) with a device that comprises:
  a first and second prism;
  a first and second thin metal film,
  wherein the first thin metal film is coated on a surface of the first prism and the second thin metal film is coated on a surface of the second prism;
  an ion exchange membrane; and
  a first and second cell body,
  wherein each cell body comprises an inlet and outlet;
  and the method comprises positioning the first prism in a light beam path and then positioning the second prism in the light beam path.

The foregoing will become more apparent from the following detailed description, which proceeds with reference to the accompanying figures.

DETAILED DESCRIPTION

Disclosed herein is a rotating dual-electrode infrared cell for in situ electrochemical (EC) attenuated-total-reflection infrared spectroscopic (ATR-IRS) investigations of fuel cells and batteries under operating conditions. The design is unique in that it for the first time allows for ATR-IRS measurements to be made on both anode and cathode while a fuel cell is operational and electrochemical measurements are on-going. We demonstrate the device's capabilities by making sequential, iterative ATR-IRS measurements of direct methanol fuel cell (DMFC) reactions at the PtRu anode and Pt cathode as a function of cell driving current (thus potential) while controlling the electrochemical parameters. Different chemical species involved in the anodic methanol oxidation reaction (MOR) versus those involved in the cathodic oxygen reduction reaction (ORR) can be identified and quantified during the operation of the fuel cell. The same setup can be applied directly to study anodic and cathodic chemistry in batteries.

Figure 1:
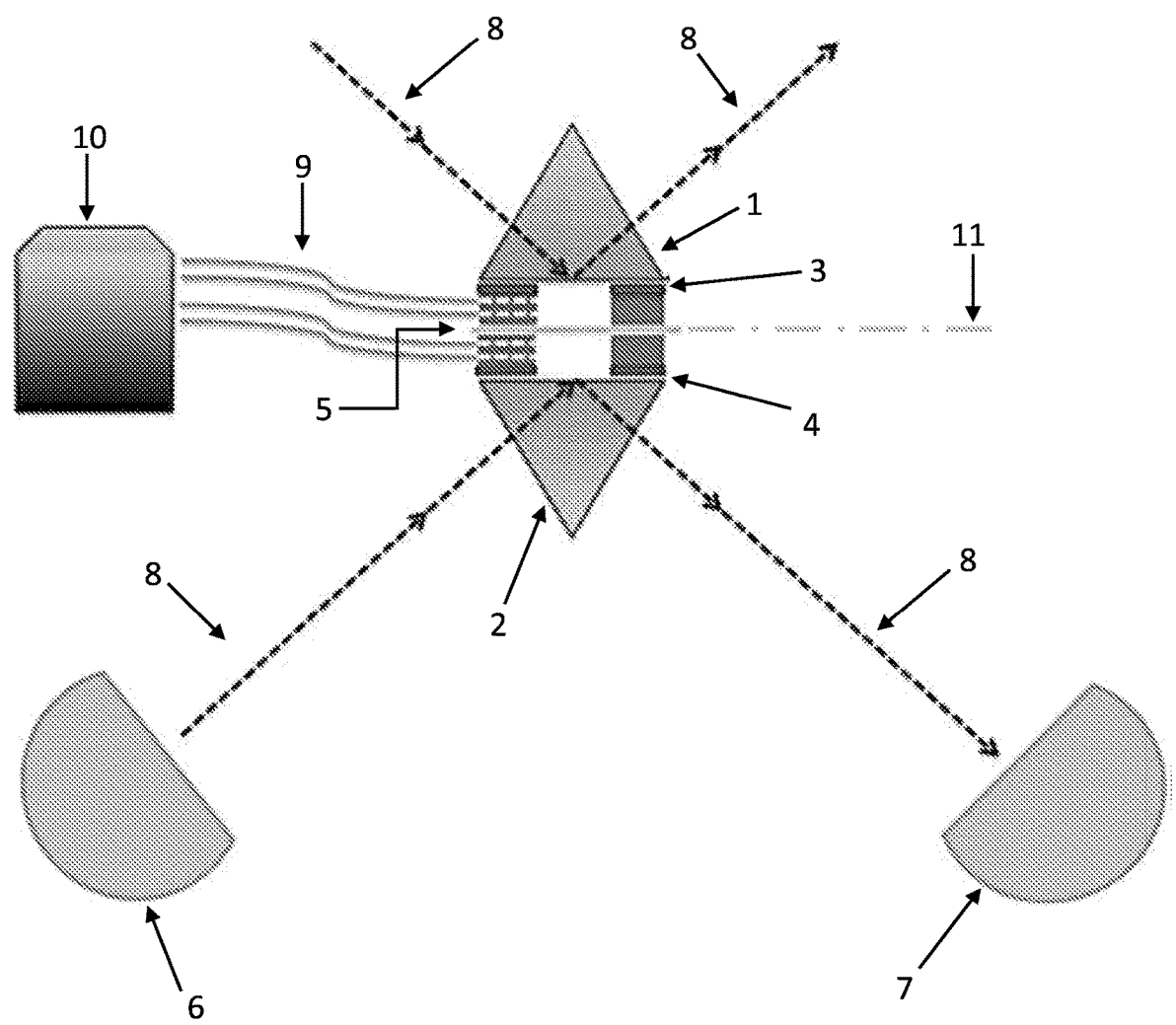
FIG. 1 is a schematic of the rotating dual-electrode in situ EC ATR-IRS device. A systolic pump introduces methanol fuel into the fuel cell while the IR measurement is made on the cathode. Periodically, the cell rotates automatically 180 degrees about the center, moving the anode prism to the measurement position without interruption of operation. Electrochemistry is simultaneously controlled by means of potentiostat leads to the anode and cathode.

The rotating dual electrode attenuated-total-reflection surface enhanced infrared reflection adsorption spectroscopy (ATR-SEIRAS) experimental setup is outlined in the drawing in FIG. 1. The device in FIG. 1 includes a first prism 1, a second prism 2, an anode 3, a cathode 4, an ion exchange membrane 5, an IR source 6, and IR detector 7, an optical beam path 8, flow lines 9, a systolic pump 10, and an axis of rotation 11. Light from the IR source 6 is reflected through a Si prism 1 or 2, whose active surface is coated with thin (60 to 100 nm) metal films. The prism material can be any infrared-transparent material. For example, apart from Si, ZnSe or CaF2 could be used. The dimensions and angles of the prism are not restricted as long as the prism is made of infrared-transparent materials. In one embodiment, the prism side wall height is 25.0 mm and the prism triangle is an equilateral triangle having a side length of 20.0 mm.

If nanoparticle electrocatalysts are used, they can be drop-casted onto the respective supporting metal films prior to cell assembly. In our experiments, an Au catalyst-supporting film was used at the anode and coated with a PtRu catalyst. Further illustrative anode films include Cu, Pd, Ru, or Ag. Other types of catalysts could include any type of synthesized nanoparticles or supported nanoparticles, including but not limited to Pt, carbon-supported Pt, Pd, carbon-supported Pd, Ru, or carbon-supported Ru. The anode film also can be any electrocatalyst that can be deposited as a thin film. A pure Pt film was used at the cathode. Illustrative types of films are usable at the cathode include Au, Pt, Cu, Pd, Ru, and Ag. An ion exchange membrane separates the anode and cathode chambers of the fuel cell. Four flexible flow lines carry fuel and electrolyte to and from the anode and cathode chambers. Illustrative fuels for the anode include hydrogen, methanol, formic acid and ethanol. Illustrative fuels for the cathode include air and oxygen. The electrolyte can dissolve and carry the fuels for the anode and/or cathode. Illustrative electrolytes include perchloric acid, sulfuric acid, and phosphoric acid. A Thermo Nicolet 6700 IR spectrometer was modified to accommodate our rotating dual-electrode cell.

Figure 2:
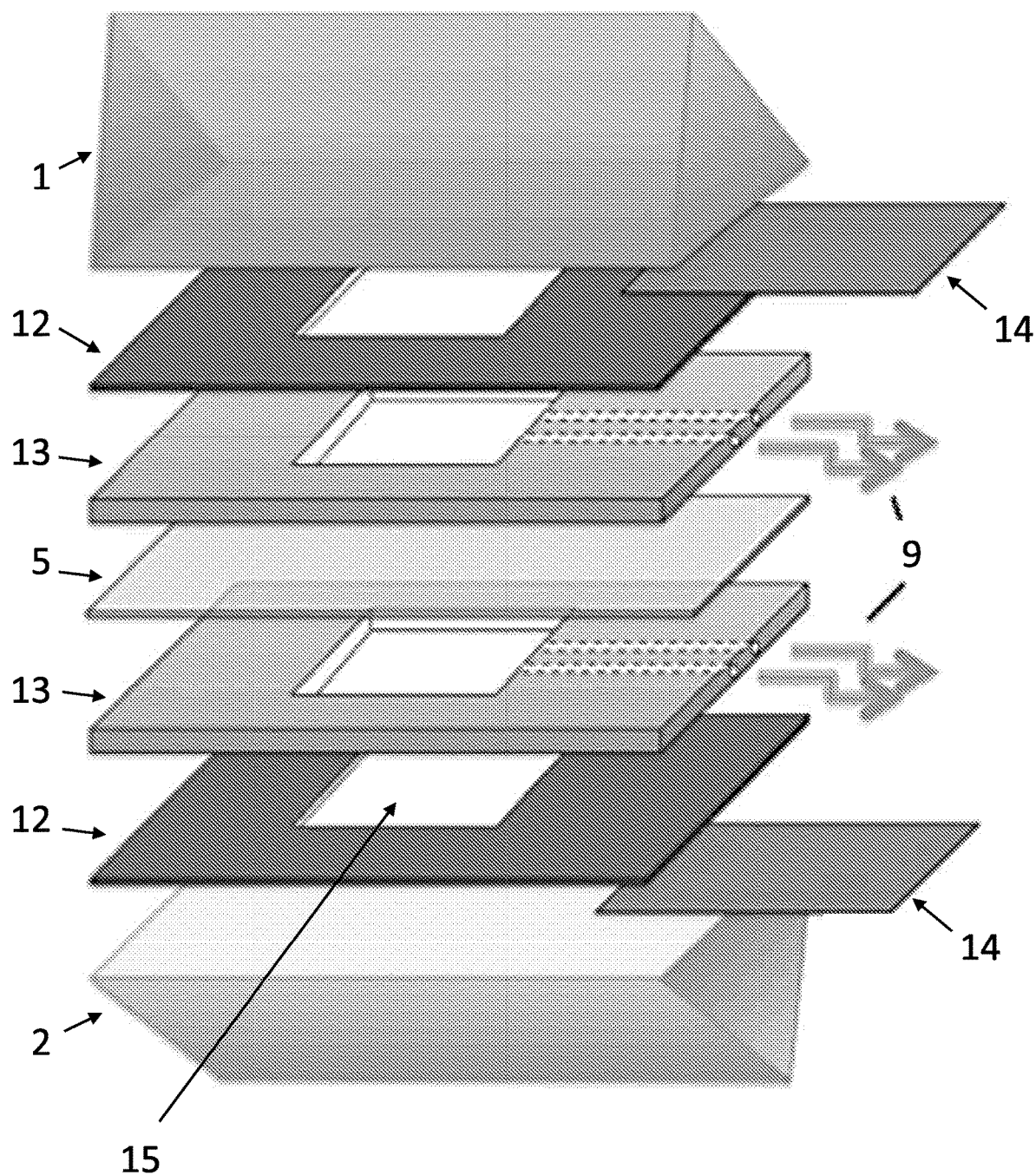
FIG. 2 is a blowup of the direct methanol fuel cell. 1: prism with Au deposited on one face as supporting metal film for PtRu/C electrocatayst. 12: Viton rubber seal. 13: Teflon cell body, with inlet and outlet holes for fuel lines 9. 5: ion exchange membrane. 9: fuel lines attached to a pump. 14: Cu foil for electrical access to electrodes.

The fuel cell body is constructed of 6 mm thick Teflon cells with 2 cm×2 cm cavities 15 as fuel repositories on both the cathode and anode sides as shown in FIG. 2. The cavities 15 serve as reservoirs for holding the electrolyte and fuel. The cathode reservoir is isolated from the anode reservoir by the ion exchange membrane (which does not have an opening). The laser light is incident on the electrocatalyst thin film through the prism, and the light penetrates the thin film and probes the part of the electrocatalyst that is in contact with the electrolyte reservoir.

Inlet and outlet pathways 9 to the cell allow the attachment of flexible tubing for fuel and electrolyte delivery. The cell halves 13 are separated by an ion exchange membrane 5 (e.g., Nafion 115) and are sealed to the IR prisms 1 and 2 with Viton rubber seals 12. The fuel and electrolyte are thus contained within the airtight cell, and are in contact with the respective PtRu and Pt surfaces of the dual prisms 1 and 2. The metal films were deposited onto the Si prisms using electroless solution deposition. Electrical leads to the prism are provided by thin copper foil 14 inserted between the Viton seal 12 and the prism 1 or 2. These do not compromise the seal and are not in contact with the electrolyte, but provide electrical access to the metal-plated prism faces that act as anode and cathode respectively.

To perform an experiment, the cell is held static with one of the two prisms in the beam path while IR measurements are made at a given cell current/potential. When the measurements are completed, the cell automatically rotates 180 degrees along the ion exchange membrane axis 11, whereupon the opposite prism is introduced into the beam path. The same IR measurements are then carried out at the same cell current/potential on the opposite electrode. The cell remains static for the duration of the measurement, and then rotates back to the original position for the next measurements at a different cell current/potential. In this way, sequential anodic and cathodic measurements are acquired iteratively as the electrochemical parameters are changed.

ATR-SEIRAS data acquisitions were carried out on a Thermo Nicolet 6700 Fourier transform IR spectrometer equipped with a liquid-nitrogen-cooled mercury-cadmium-telluride (MCT) detector. The spectral resolution was set to 4 cm-1. The obtained spectra were shown in the absorbance units defined as −log(I/I0) where I and I0 are the single-beam spectral intensities at the measuring potential and the reference potential, respectively.

The duel electrode ATR-SEIRAS fuel cell design allows for continuous cycles of alternating cathode and anode measurements of a fuel cell under electrochemical control without disturbing the cell operation. Illustrative fuel cells include DMFC, PEMFC (anode—hydrogen; cathode—air or oxygen; electrolyte—perchloric acid, sulfuric acid or phosphoric acid), DFAFC (anode—formic acid; cathode—air or oxygen; electrolyte—perchloric acid, sulfuric acid or phosphoric acid), and DEFC (anode—ethanol, cathode—air or oxygen; electrolyte—perchloric acid, sulfuric acid or phosphoric acid).

Initial measurements were performed on a DMFC configuration. The cathode side of the cell was catalyzed by an approximately 90 nm thick platinum nano-film deposited on one Si prism. Oxygen saturated 0.1 M $HClO_4$ was pumped into the cathode chamber at a flow rate of 45 ml/min. The anode side of the cell was catalyzed with 167 μg of 60 wt % PtRu/C (Johnson-Matthey) deposited on an Au supporting nano-film deposited on the other Si prism. The anode chamber was filled with 2 M methanol in 0.1 M $HClO_4$, also flowing at 45 ml/min. The open circuit potential of the cell was 0.55~0.6 V, consistent with the values seen by other studies. Electrochemical control of the experiment consisted of monitoring the voltage of the cell as the current was varied between 0 and 1 mA. Simultaneously, alternating in situ IR measurements were performed on the cathode and anode for a total of 9 cycles (18 total measurements).

Figure 3:
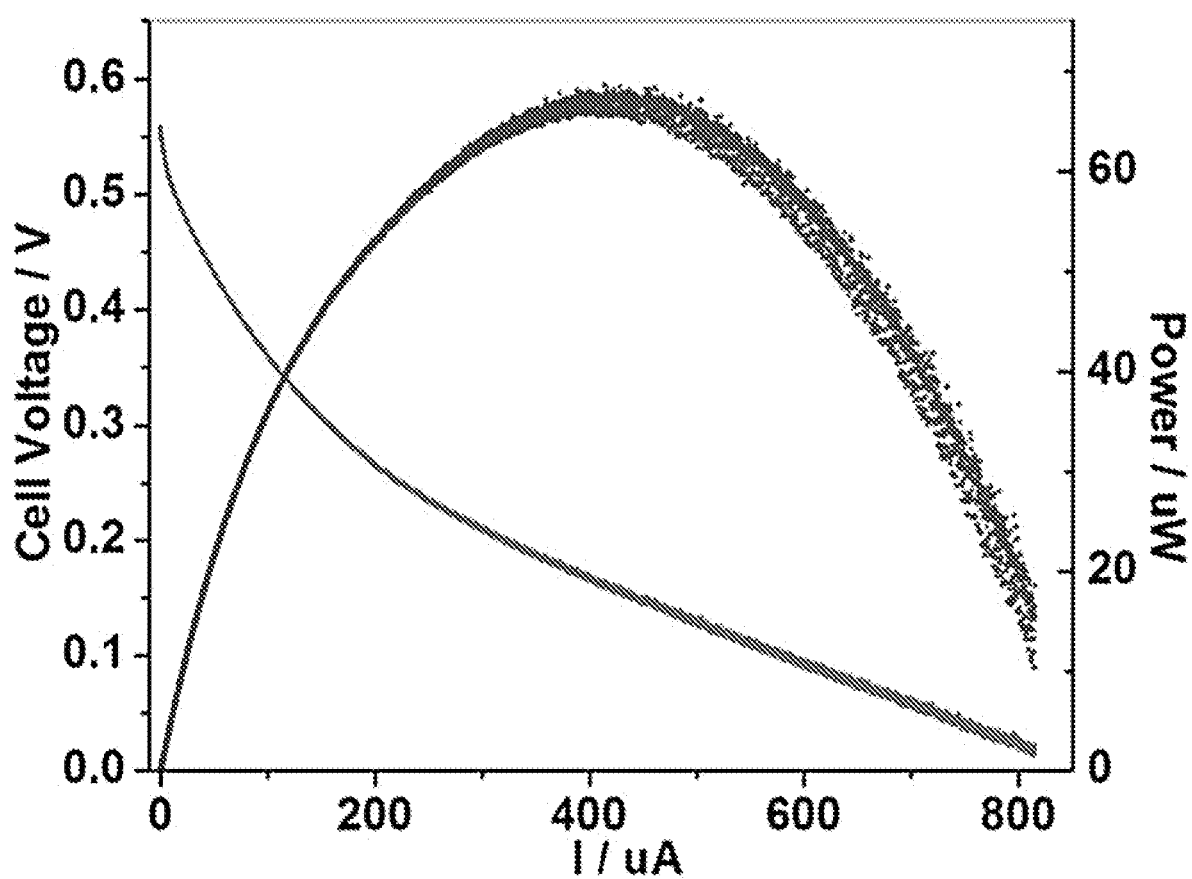
FIG. 3 is a chronopotentiometry curve (red, left axis) and the corresponding power profile (blue, right axis) in the rotary DMFC cell. Anode (167 µg 60 wt % PtRu/C)—2 M methanol in 0.1 M $HClO_4$; Cathode (Pt nanofilm ~90 nm)—$O_2$-saturated 0.1 M $HClO_4$. Solution flow rate is 45 ml/min.

Fully optimized and functional fuel cells, such as commercial fuel cells, generally employ a membrane electrode assembly (MEA) in lieu of the conducting electrolyte used in our experiments. In these systems, only the desired gases are introduced to the catalytic surfaces, and any water is carefully controlled or removed. This allows for a fully optimized current as the maximum amount of oxygen gas is presented to the anode surface. While a conductive electrolyte is often used in research studies to mimic fuel cell operation, as it is in ours, the power of such a fuel cell is significantly reduced due to the low solubility of oxygen in water (approximately 0.25 mM at room temperature) and the resulting diffusion-limited transport of the oxygen to the anode catalyst. The red trace in FIG. 3 shows the voltage profile of the cell under current control. As the current was varied from 0 to 1 mA the cell voltage dropped, approaching 0 V at an applied current of 0.85 mA. The blue trace in FIG. 3 shows the corresponding power output profile (Power=Current×Voltage), and shows that the fuel cell has a power maximum of 65 μW at around 0.45 mA. These data serve to demonstrate that the dual-electrode IR cell in a DMFC configuration works as expected (like a small fuel cell) and may be used to effectively study in situ catalyzed reactions on both the cathode and anode.

Cathode—On the platinum cathode of the DMFC, oxygen is reduced on the platinum catalyst:

$$O_2 + 4H_3O^+ + 4e^- \rightarrow 6H_2O. \quad [1]$$

Figure 4:
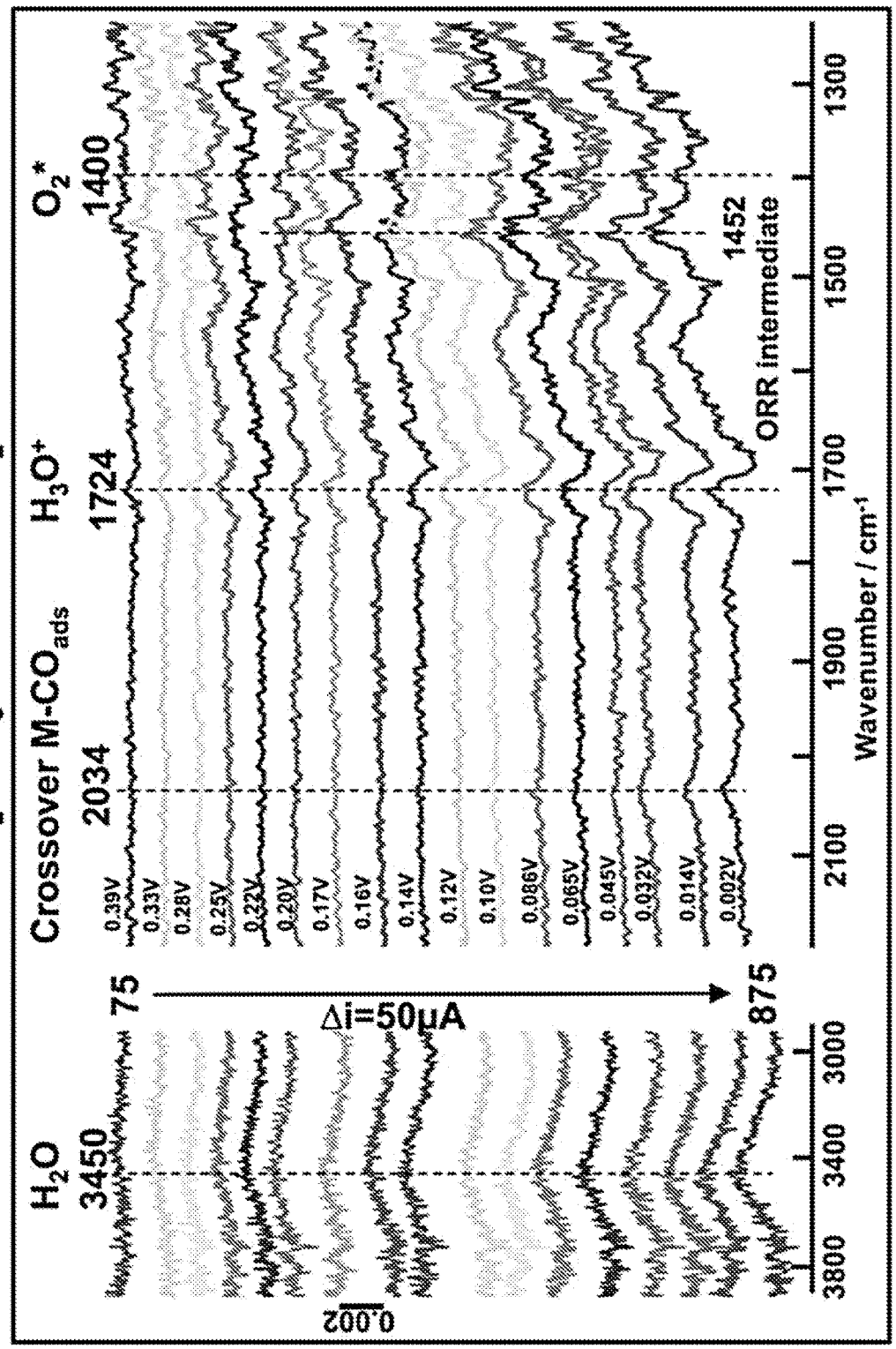
FIG. 4 shows current-dependent ATR-IR curves of ORR at the cathode of the rotary DMFC-IR cell. As the current is raised, both the reactant absorbed species ($H_3O+$ and $O_2$*) and the product ($H_2O$) of the cathode reaction can be seen to increase. Additionally, the presence of $CO_{abs}$ from methanol crossover can be seen at the highest currents. The reference spectrum was taken at the open circuit potential.

FIG. 4 shows the results of in-situ EC IR cathode measurements as the current was varied in 50 μA steps from 0 to 1 mA. For the reaction to proceed, dissolved $O_2$ and $H^+$ ions must first diffuse onto the platinum surface. Higher currents indicate a higher reaction rate, and thus more of the absorbed species should be observed at higher currents. Accordingly, we observed increasing intensity at 1400 cm$^{-1}$ (assigned to the absorbed $O_2^*$) and 1724 cm$^{-1}$ (assigned to surface hydronium). Similarly, the increase of product is indicated by the buildup of intensity at 3450 cm$^{-1}$: the signature of weakly-bonded hydrogen in $H_2O$.

Figure 5:
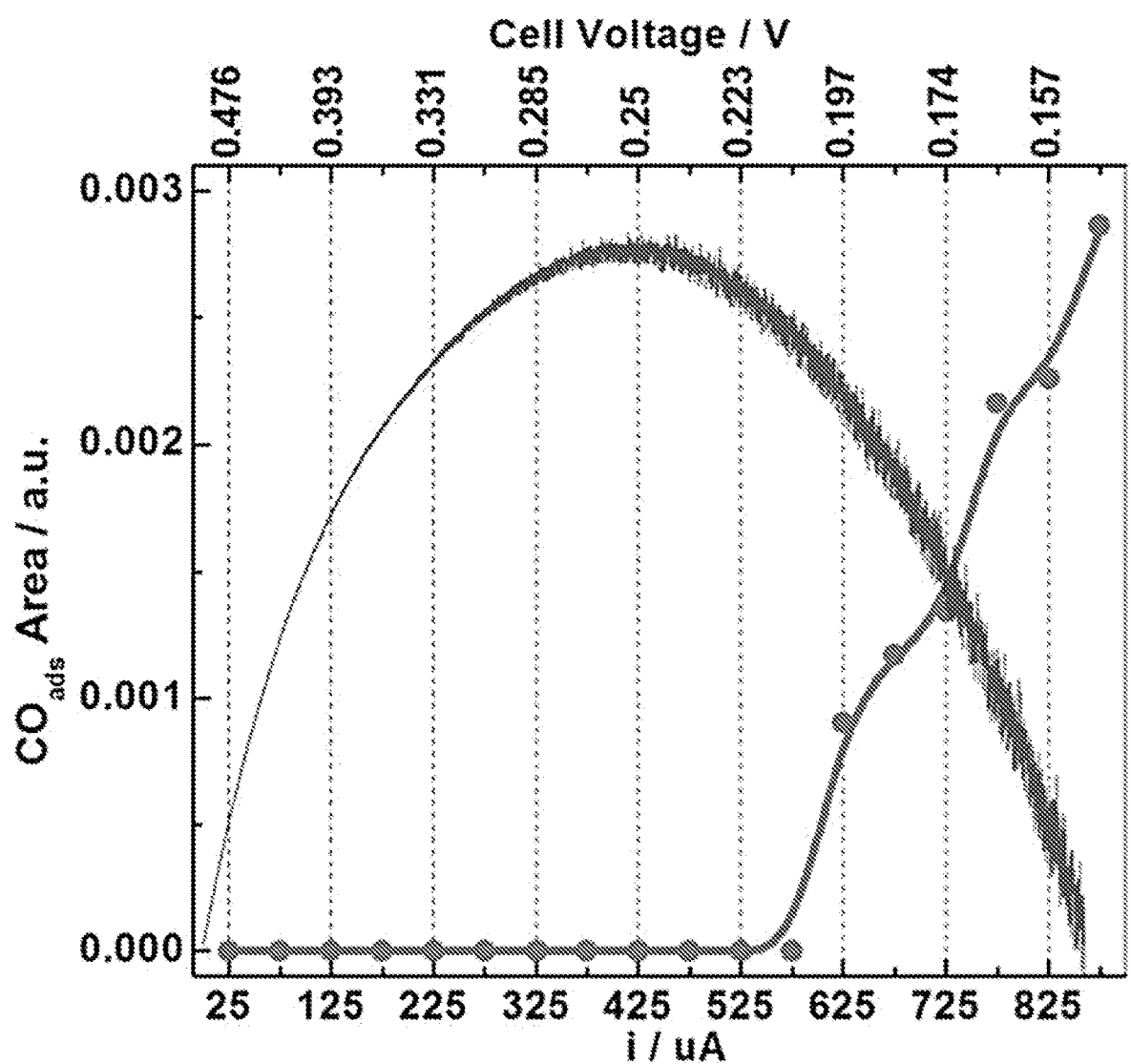
FIG. 5 shows the current dependence of the integrated $CO_{ads}$ band intensities generated from methanol crossover into the cathode chamber. The blue trace is the power output profile reproduced from FIG. 3.

Methanol crossover through Nafion membranes from the anode to cathode is a significant technical issue for DMFCs. In an oxygen-poor environment, methanol that penetrates the Nafion barrier and arrives at the cathode disassociates, leaving absorbed carbon monoxide ($CO_{ads}$) bound tightly to the active cathode catalyst sites preventing them from promoting oxygen reduction. The $CO_{ads}$ can exist on the cathode because of the relatively low concentration of oxygen in the cell due to the low solubility of oxygen in an aqueous electrolyte. In a fully optimized fuel cell with pure gas delivery to the electrodes, full combustion of the CO will eliminate it from the cell. In our duel electrode fuel cell, we observed the $CO_{ads}$ band at 2034 cm-1 on the cathode only when the current was greater than 0.6 mA, well above the optimal current for maximum power. The presence of $CO_{ads}$ is attributed to the decrease of absolute potential on cathode from the oxygen reduction reaction over-potential, resistance drop and mass transport issues at high current end. To underline this point, FIG. 5 shows the integrated band intensities of the $CO_{ads}$ at different currents compared with the cell power curve from FIG. 3. As shown, CO poisoning is negligible in the duel electrode fuel cell when operating at maximum power output current (0.45 mA) or less. $CO_{ads}$ only poisons the platinum cathode surface when the fuel cell operates at currents high compared to the optimum currents; at low currents, CO will be fully oxidized to $CO_2$. Thus this deleterious effect may be neglected in our DMFC system for optimal currents, despite our use of an aqueous electrolyte in place of a membrane electrode assembly. Our duel electrode fuel cell also departs from fully optimized commercial systems in one other way; the optimized cathode catalyst is often comprised of Pt nanoparticles coated with Nafion solution and interspersed with Teflon dispersion coated on a carbon support. In our system, we use a thin Pt film for optimal infrared transparency. Such a Pt film is expected to be chemically similar to the Pt nanoparticles to within a few millivolts, and thus mimic the chemical conditions of an optimized fuel cell. Intensity increase is also observed as a function of current in FIG. 4 at 1452 cm-1. Methylene ($CH_2$) groups are often associated with IR bands around 1450 cm-1.

While high concentrations of $CH_2$ are not expected on the cathode surface, C—H bonds are quite active in the infrared spectrum and we speculate that a small amount of $CH_2$ could be responsible for the unassigned peak. However, lacking corroborating evidence, this peak is assigned to a still unidentified intermediate species.

Anode—The anode was catalyzed by 167 μg of 60 wt % PtRu on a carbon support (Johnson-Matthey) deposited onto the supporting Au nano-film. At the anode, the methanol is oxidized:

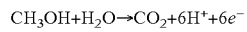

$$CH_3OH + H_2O \rightarrow CO_2 + 6H^+ + 6e^- \quad [2]$$

Figure 6:
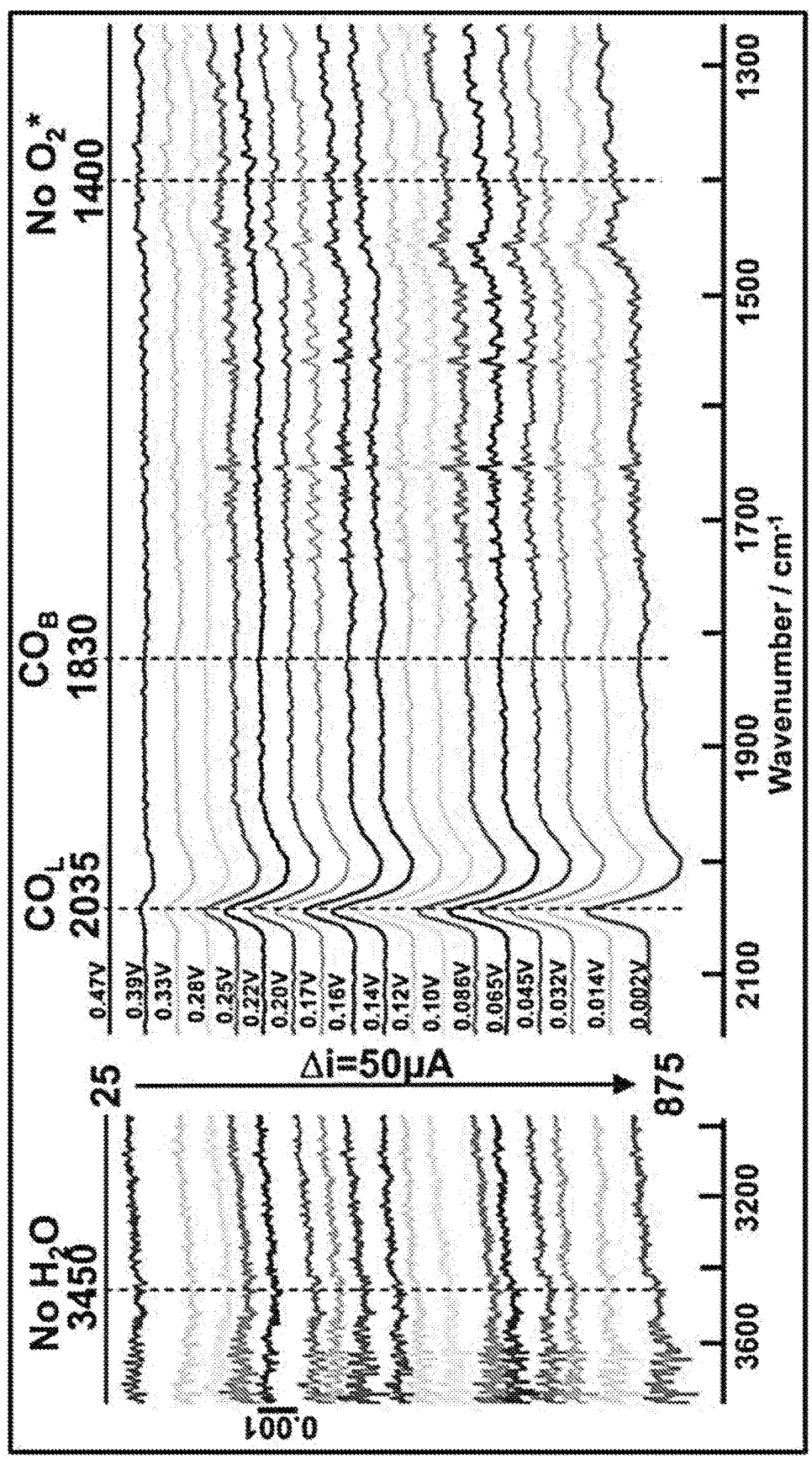
FIG. 6 shows the current dependent ATR-IR of anode of the rotary fuel cell. The anode was catalyzed with PtRu/C using 2 M methanol in 0.1 M $HClO_4$. Only the CO bands from linearly bound CO are seen to increase, in accord with the expected electrochemical reaction. The reference spectrum was taken at 25 μA current flow where surface was already populated with CO.

FIG. 6 shows the IR spectrum at the anode. In contrast to the cathode spectra, no adsorbed $O_2^*$ or water bands (1400 cm$^{-1}$ and 3450 cm$^{-1}$ respectively) were observed. This is consistent with the anticipated reaction shown above, and indicates that our duel electrode fuel cell IR system can effectively discriminate between the cathodic and anodic chemistry. IR absorption at the anode is observed from the buildup of adsorbed $CO_{ads}$ from the MOR. This absorbed species can give rise to distinct vibration bands, depending on the geometry of the $CO_{ads}$ bond to the metallic catalyst. Linearly bonded COL is located at ~2035 cm$^{-1}$ while bridge bonded COB is located at ~1830 cm$^{-1}$ in the IR spectra, as indicated in FIG. 6.

We observed in the anode spectra that linearly bound CO vibrations were present even at the smallest currents. We used the spectrum taken at 25 μA as the reference spectrum in FIG. 6 in order to minimize noise at higher wave numbers and highlight the lack of absorbed $O_2^*$. In doing so, however, the Stark effect changes the vibrational frequency of the adsorbed CO, which renders quantitative evaluation of CO band intensity unreliable. This is why there is an increasing dip in the spectra.

Figure 7:
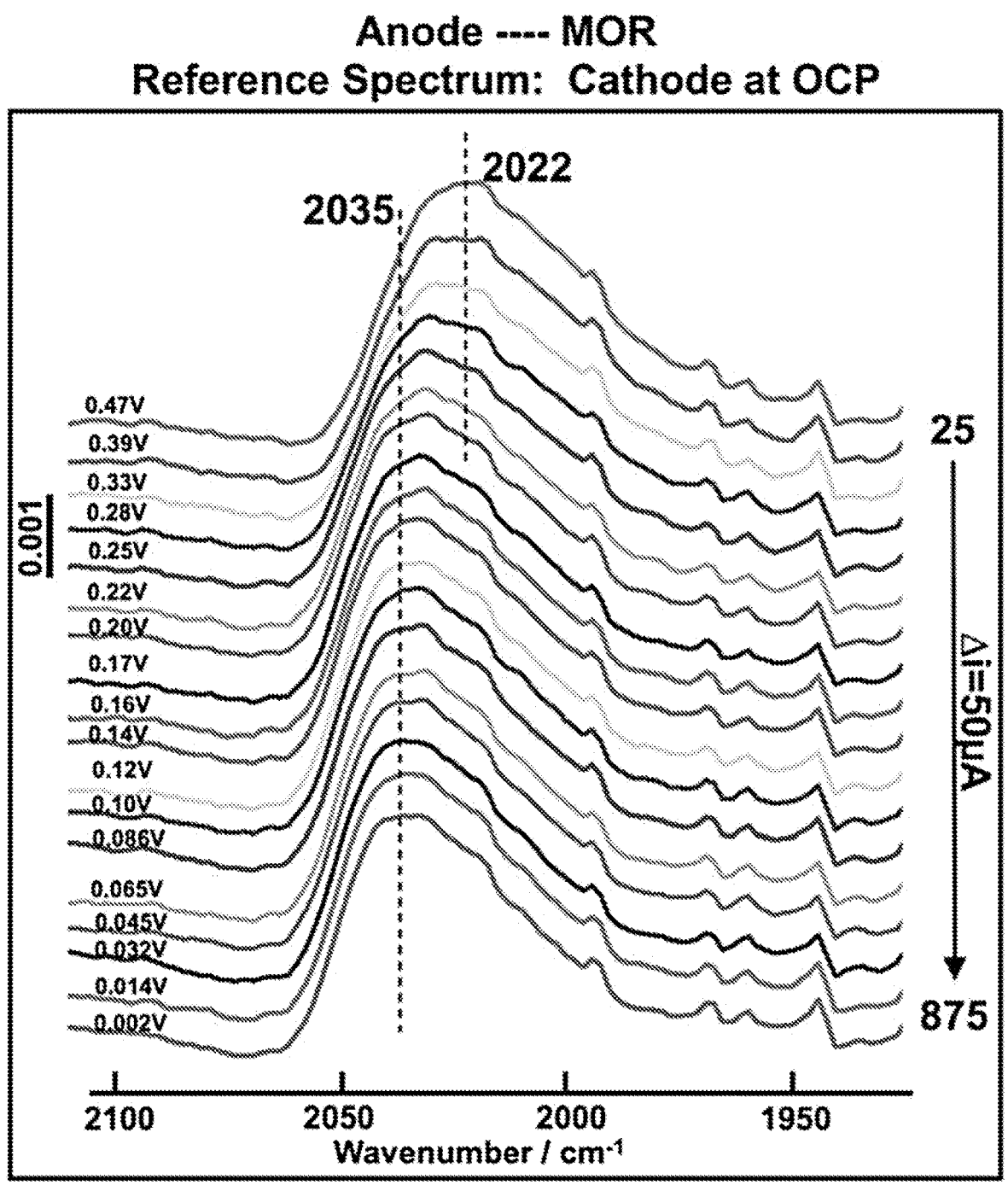
FIG. 7 shows the $CO_L$ band on the anode during fuel cell operation. The same data as in FIG. 6, but referenced to the open circuit potential spectrum in which no adsorbed CO is expected. The two vertical lines indicate the change in frequency due to the Stark effect. As can be seen, the CO concentration on the catalyst is roughly constant throughout the experiment.

In order to see the true intensities of the COL band, the data in FIG. 6 were re-referenced to the open circuit potential spectrum on the cathode where no adsorbed CO was present. The re-referenced spectra of the COL band are plotted in FIG. 7. Here one can observe that the linearly bonded COL bands shown in FIG. 6 have roughly constant intensity. No obvious decrease is observed as the current is increased in the cell. The stark tuning effect at low current densities is more obvious. The tuning rate calculated by cell voltage is about 30 cm-1/V, which agrees well with the accepted value on Pt (27.5 cm-1/V). Other operando research shows a much smaller tuning rate (<10 cm-1/V), which is attributable to the use of Nafion and steam supply on anode catalyst. We conclude that the $CO_{ads}$ poisoning appeared immediately upon operation of the fuel cell and was not eliminated during the course of the experiment. Evidently another reaction pathway, likely the oxidation of methanol through formate, was contributing to the current supply throughout the range of our experiment. Similar side reactions have been noted before by other investigations of methanol oxidation reactions.

In view of the many possible embodiments to which the principles of the disclosed invention may be applied, it should be recognized that the illustrated embodiments are only preferred examples of the invention and should not be taken as limiting the scope of the invention.

What is claimed is:

1. A rotating dual-electrode infrared cell for in situ electrochemical attenuated-total-reflection infrared spectroscopy (ATR-IRS) comprising:
    a first and second prism;
    a first and second metal film,
    wherein the first metal film is coated on a surface of the first prism and the second metal film is coated on a surface of the second prism;
    an ion exchange membrane; and
    a first and second cell body,
    wherein each cell body comprises an inlet and outlet, and the ion exchange membrane is located between the first and second cell bodies forming a first cell body/ion exchange membrane/second cell body structure, and the first cell body/ion exchange membrane/second cell body structure is located between the first prism and the second prism.

2. The rotating dual-electrode cell of claim 1, wherein one of the first and second metal films is configured as an anode and another one of the first and second metal films is configured as a cathode.

3. The rotating dual-electrode cell of claim 1, further comprising:
    a first and second seal, wherein the first seal is located between the first prism and the first cell body, and wherein the second seal is located between the second prism and the second cell body.

4. The rotating dual-electrode cell of claim 1, further comprising:
    a light source configured to reflect light through the plurality of prisms.

5. The rotating dual-electrode cell of claim 1, further comprising:
    a plurality of fuel lines, wherein each of the fuel lines is connected to one of the inlet and outlet holes of the first and second cell bodies.

6. The rotating dual-electrode of claim 2, wherein each of the first and second cell bodies respectively comprise a cavity.

7. The rotating dual-electrode of claim 6, further comprising:
    a first and second seal, wherein the first seal is located between the first prism and the first cell body, and wherein the second seal is located between the second prism and the second cell body;
    a light source configured to reflect light through the plurality of prisms;
    a plurality of fuel lines, wherein each of the fuel lines is connected to one of the inlet and outlet holes of the first and second cell bodies; and
    a first electrical lead electrically coupled to the first metal film and a second electrical lead electrically coupled to the second metal film.

8. The rotating dual-electrode cell of claim 1, further comprising:
    a first electrical lead electrically coupled to the first metal film and a second electrical lead electrically coupled to the second metal film.

9. The rotating dual-electrode of claim 1, wherein each of the first and second cell bodies respectively comprise a cavity.

10. The rotating dual-electrode of claim 1, wherein the first and second metal film each has a thickness of 60 to 100 nm.

11. The rotating dual-electrode of claim 2, wherein the first metal film is configured as an anode and comprises an Au supporting film and a PtRu catalyst, and the second metal film is configured as a cathode and comprises a Pt film.

12. A device comprising:
    (a) a module comprising:
        (i) a first prism having a first metal film disposed on an inner surface of the first prism and a second prism having a second metal film disposed on an inner surface of the second prism;
        (ii) a fuel cell body located between the inner surface of the first prism and the inner surface of the second prism;
    (b) a light source configured to direct a light beam to the first prism or to the second prism; and
    (c) a detector configured to receive a light beam reflected from the first prism or from the second prism.

13. The device of claim 12, wherein the first metal film is configured as an anode and the second metal film is configured as a cathode.

14. The device of claim 13, wherein the first metal film comprises an Au supporting film and a PtRu catalyst, and the second metal film comprises a Pt film.

15. The device of claim 12, wherein the fuel cell body comprises:
    a first cell body located adjacent to the first metal film;
    a second cell body located adjacent to the second metal film; and
    an ion exchange membrane positioned between the first cell body and the second cell body.

16. The device of claim 15, wherein the first cell body comprises a first cavity, and the second cell body comprises a second cavity.

17. A method comprising:
    positioning a first prism in a light beam path and then positioning a second prism in the light beam path, wherein the first prism and the second prism are included in a device that comprises:
    the first and second prism;
    a first and second metal film,
    wherein the first metal film is coated on a surface of the first prism and the second metal film is coated on a surface of the second prism;
    an ion exchange membrane; and
    a first and second cell body, wherein each cell body comprises an inlet and outlet, and the ion exchange membrane is located between the first and second cell bodies forming a first cell body/ion exchange membrane/second cell body structure, and the first cell body/ion exchange membrane/second cell body structure is located between the first prism and the second prism.

18. The method of claim 17, comprising initially positioning the first prism in the light beam path, and then rotating the device so that the second prism is positioned in the light beam path.

19. The method of claim 17, wherein the light beam path is an IR light beam path.

20. The method of claim 19, wherein one of the first and second metal films is configured as an anode and another one of the first and second metal films is configured as a cathode, and each of the first and second cell bodies respectively comprise a cavity, wherein each cavity holds an electrolyte and a fuel.

21. The method of claim 20, wherein the method comprises directing the IR light beam path through the first prism and performing IR measurements on the first metal film, rotating the device, and directing the IR light beam path through the second prism and performing IR measurements on the first second film.

* * * * *

UNITED STATES PATENT AND TRADEMARK OFFICE
CERTIFICATE OF CORRECTION

| | | |
|---|---|---|
| PATENT NO. | : 11,035,791 B2 | |
| APPLICATION NO. | : 15/779465 | |
| DATED | : June 15, 2021 | |
| INVENTOR(S) | : Tong et al. | |

It is certified that error appears in the above-identified patent and that said Letters Patent is hereby corrected as shown below:

In the Specification

Please add the following paragraph to Column 1, immediately following the "CROSS REFERENCE TO RELATED APPLICATIONS" paragraph:
--ACKNOWLEDGMENT OF GOVERNMENT SUPPORT
This invention was made with government support grant number DE-FG02-07ER15895 awarded by the Department of Energy. The government has certain rights in the invention.--

Signed and Sealed this
Thirtieth Day of May, 2023

Katherine Kelly Vidal
*Director of the United States Patent and Trademark Office*